June 25, 1957 M. H. SWEET 2,797,334
ILLUMINATING ATTACHMENT FOR LIGHT MEASURING INSTRUMENTS
Filed April 5, 1954 3 Sheets-Sheet 1
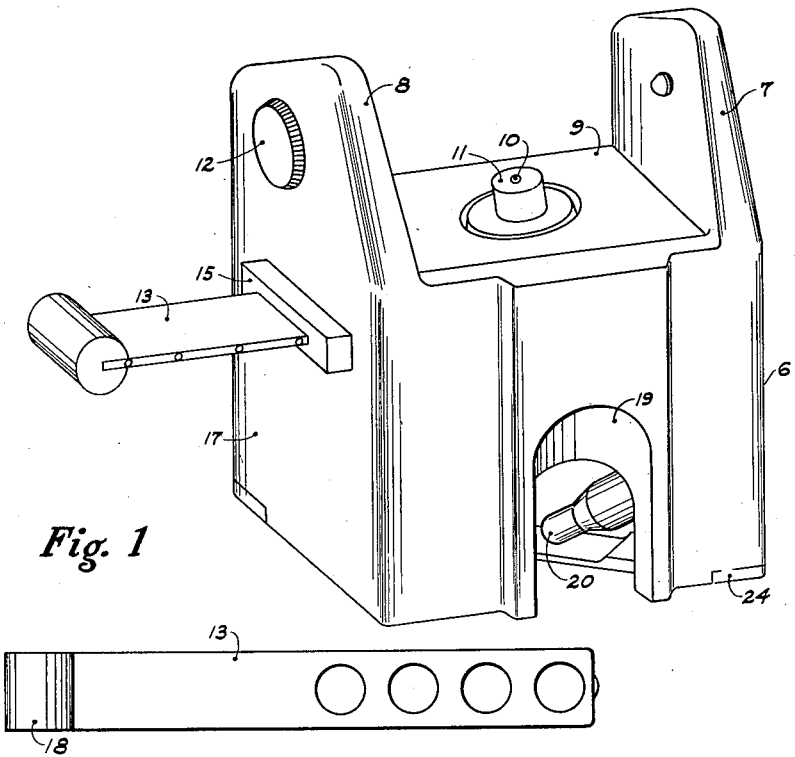
*Fig. 1*
*Fig. 3*
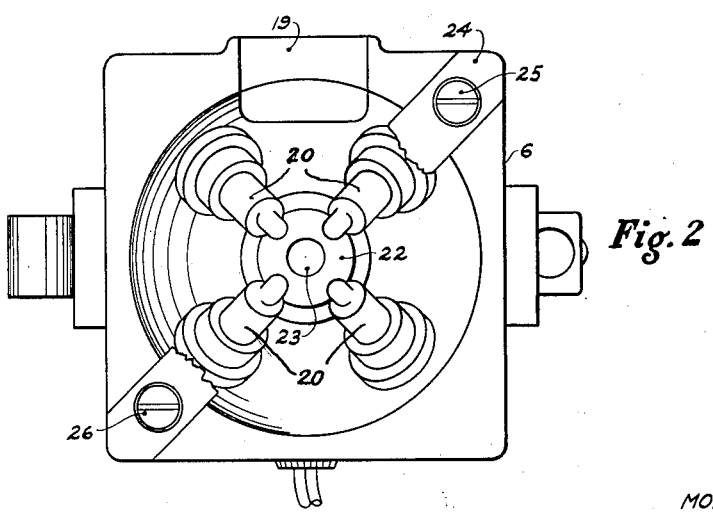
*Fig. 2*
INVENTOR
MONROE H. SWEET
BY
ATTORNEY

INVENTOR
MONROE H. SWEET
BY
ATTORNEY

United States Patent Office 2,797,334
Patented June 25, 1957

2,797,334

ILLUMINATING ATTACHMENT FOR LIGHT MEASURING INSTRUMENTS

Monroe H. Sweet, Binghamton, N. Y., assignor to General Aniline & Film Corporation, New York, N. Y., a corporation of Delaware Application April 5, 1954, Serial No. 420,811

4 Claims. (Cl. 250—220)

This invention relates to light measuring apparatus and more particularly to attachments for such apparatus for illuminating a surface in order to measure the reflected light.

There are various types of devices for measuring light and correlating the light value obtained with certain physical characteristics desired to be determined. Such instruments generally employ a photoelectric sensing element which translates the light intensity value into a corresponding electrical magnitude. This sensing device which may be in a form of photocell or phototube is usually placed in a light-tight enclosure with a relatively small aperture through which light may enter. Often such an enclosure is in the form of an arm which may be hinged so as to be lifted and placed over a transparent or translucent specimen and thereby measure the light which passes through it and determine the translucency, opacity or density of the specimen.

A particular type of instrument which finds wide use for such measurements employs a hinged arm housing a photoelectric tube and cooperates with a platform or table on which the specimen is placed. This arm provides a light-tight housing as well as electric shielding for the phototube. A small aperture in the arm which rests over the specimen permits light to enter and energize the phototube.

It is frequently desirable to determine certain characteristics of a specimen which is opaque and light will not pass through it. In such a case, the light reflected from the specimen may be correlated with certain physical characteristics such as reflectance, color values, etc.

It is the primary object of this invention to extend the usefulness of instruments of the type mentioned to reflection measurements and, to this end, an accessory apparatus is provided in the form of a reflection measuring attachment or head.

Another object of the invention is to provide such an attachment in a compact and simple form which can readily be used in connection with such instruments.

A particular feature of the invention is that the measuring head or attachment may be used without detaching the arm of the instrument by simply placing the head on the platform or table on which the arm normally rests. Means are provided for guiding the light in the direction normal to the angularly positioned arm.

Another feature of this invention is that the attachment includes light sources so positioned and distributed as to illuminate the specimen area under measurement from directions complementary to produce a total illumination in an azimuthal circle over which the variation is integrated. In this manner, undesirable effects of singular light reflections, due to textural origin, are eliminated.

Other features of the reflection measuring attachment are that the area under measurement is optically projected onto the phototube and the specimen under examination may be viewed directly.

Other objects and features will be apparent from the following description of the invention, pointed out in particularity in the appended claims, and taken in connection with the accompanying drawings, in which:

Fig. 1 is a front elevational view in perspective of the reflection attachment;

Fig. 2 is a bottom view thereof;

Fig. 3 is a top view of the filter holder strip;

Figure 4:
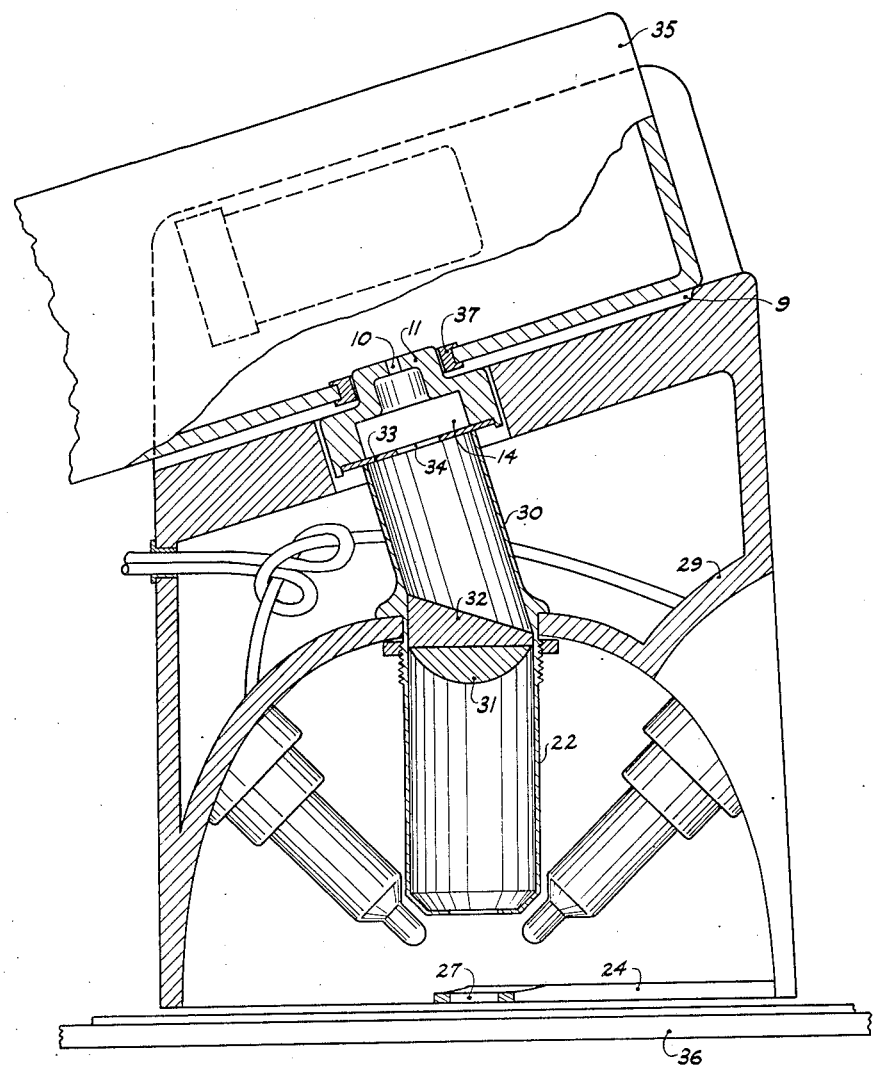
Fig. 4 is a cross-sectional view of the reflection attachment in use with the measuring arm of a photoelectric instrument.

Essentially, the attachment consists of an enclosure or block-like housing which has a suitably inclined rest on top for the phototube arm and a flat bottom with a specimen pressure brace and angularly placed light sources distributed for proper illumination of the specimen. Within the block is a vertically extending channel forming a light passageway which communicates with the aperture in the phototube arm. Optics within this channel deflect the light reflected from the specimen to the proper angle to follow the deviation of the channel. An image of the illuminated area is projected onto the cathode of the inclined phototube. A series of color filters may also be selectively inserted in the path of the light beam.

Referring to the drawings, the various views shown may be considered together in following the figures, for the general assembly of the attachment consists of only few parts and presents a simple structural embodiment.

In the perspective view of Fig. 1, it is seen that the attachment comprises a rectangularly shaped enclosure or block 6 which has a cut-out portion between flanges 7 and 8. The upper wall 9 of the block 6 between the flanges forms a sloping surface in the center of which is a tubular extension 11, having an aperture 10, the purpose of which will be explained later. Threaded into the side of each flange is a clamping bolt 12 protruding into the cut-out portion to a sufficient extent for clamping the arm housing the phototube between the flanges.

A filter holder strip 13 may be inserted into the block 6 through a suitable slot 14 guided by a reinforced extension 15 of the side wall 17 of the block 6. The filter holder strip 13, as seen in Fig. 3, has four circular apertures which accommodate colored glass or other suitable filters indicated by the letters designating the particular colors, such as red, green, blue, and yellow. The filters are so arranged in the strip 13 that when the handle 18 engages the extension 15, the red filter is in proper position within the block. Marks on the edge of the strip 13, properly colored, indicate with respect to the extension 15 which of the particular filters is in proper position inside the block.

The front wall of the block 6 has a cut-out 19 which communicates with the interior in order to determine the position of the block with respect to the surface on which it is placed. This is for the purpose of enabling the user to see the center of the bottom portion and place the block in proper position over the sample. This is advantageous in that the operator may at all times observe directly the area to be illuminated and may also place the attachment over the specimen at the exact location desired.

As seen in Fig. 2, the bottom portion of the block 6 is hollowed out and accommodates four directional light sources 20 of the general type known as "pencil flashlight lamps." These are placed at an angle of approximately 45° from the horizontal plane of the bottom of the block 6 and are distributed in a plane of approximately 90° with respect to each other. In the center of the block 6 extending in a direction normal to the plane of the lower portion of the block is a cylindrical tube 22, having an aperture 23. This communicates with the upper portion of the block 6 into which it extends, as seen in greater detail in the sectional view of Fig. 4. It will be observed also that the hollowed out bottom portion of the block 6, when placed over a specimen, forms a shield around the surface thereof to exclude extraneous light. The light which may enter through the cut-out 19 is negligible in comparison with the illumination of the lamps 20.

Diagonally across the bottom portion of the block 6 and recessed therein is a specimen pressure brace 24 held by screws 25 and 26. The center part of this brace is cut away in Fig. 2 in order to more clearly show the placement of the light sources 20. A better view of this is seen in Figs. 1 and 4, which show that the brace 24 intersects the center of the block 6 and has a circular aperture 27 coaxial with the aperture 23 of the tube 22.

Referring to Fig. 4, the internal construction of the block 6 includes a center cross wall 29 which supports the tube 22. The latter has an angular extension 30 which terminates in the tubular extension 11. The tube 22 and the angular extension 30 thereof form a light passageway which interconnects the upper and lower portions of the block 6. A lens 31 in the tube 22 and a prism 32 adjacent the lens comprise the optics for guiding the light in the direction coaxial to the extension 30 and through the aperture 10 of the tubular extension 11. A plate 33, having an aperture 34, forms a support for the filter strip 13 which slides in the slot 14.

The inclined wall 9 of the block 6 is of such slope that it accommodates the arm 35 as it is lifted over its hinges from the working platform 36. Both the arm 35 and the platform 36 are only partially shown and are part of the light measuring instrument to which the reflection attachment is an accessory. It is seen that the tubular extension 11 is so dimensioned that it will fit into the aperture of the arm 35 which generally has a resilient grommet 37 to insure a light-tight enclosure.

Figure 5:
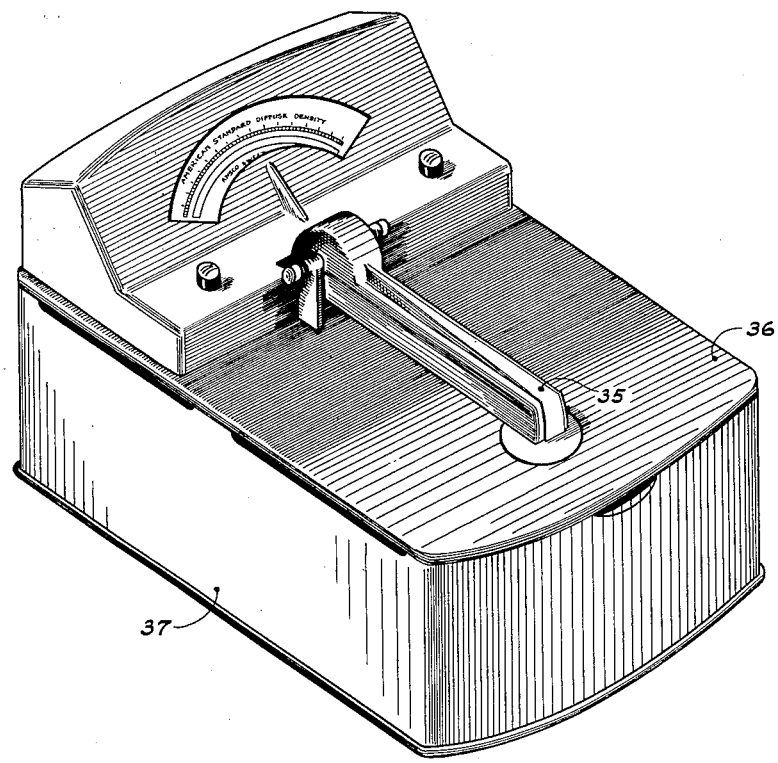
Fig. 5 is a perspective view of the type of measuring apparatus to which the reflection head shown in Figs. 1, 3 and 4 may be attached.

Referring to Fig. 5, an instrument for measuring the light transmitted through a specimen is shown, by way of example, having a hinged arm 35 which lifts off the platform 36 so that a specimen may be inserted under the arm 35 and transilluminated by a light source within the housing 38. The light intensity reading appears on a scale and may be calibrated in any desired units.

In order that the instrument shown in Fig. 5 may be used for reflectance measurement, the attachment herein described is employed in the following manner.

The arm 35 is lifted from the platform 36 so that the block 6 may be placed thereon and the arm 35, resting on the inclined wall 9 is clamped between the flanges 7 and 8 by means of the clamping bolts 12. The aperture 27 in the specimen pressure brace 24 can be seen through the cut-out 19 in the front wall of the block 6 so as to locate the particular portion of the specimen to be inspected. The brace 24, resting on the specimen, imparts the weight of the attachment and thereby flattens the specimen over the area to be illuminated. The light sources 20, by their angular placement, direct a beam of light from four directions onto the center of the aperture 27 and irradiate the area defined thereby. The reflected light enters the tube 22 and is collected by the lens 31. The beam so formed is then deflected in the direction parallel with the inclined portion of the tube 22 by the prism 32 and passes through the aperture 10 in the tubular extension 11 and an image of the area under observation is projected onto the photocell in the arm 35 shown in outline in Fig. 4.

When the color components of the reflected light are material in the measurements, the filter strip 13 is inserted and readings are taken with the various color filters placed in the path of the light beam. The lamps 20 surround the end of the tube 22 and are of such distance from the aperture 23 that no direct radiation of light from the lamps can reach the inside of the tube 22. Moreover, these lamps are constructed with lenses at their tip which concentrate the light into a narrow beam. The four lamps, each displaced at an angle of 90° from the other, throw beams from directions complementary to eliminate the effects of singular light reflection and polarization of textural origin in the specimen.

The attachment with the light distribution in the manner shown allows simple and quick reflection conversion of transmission type instruments and requires only one application for each particular area inspected in contradistinction to former methods which require several readings in the same area to offset inaccuracies due to textural reflections.

I claim:

1. Illuminating attachment for converting a photoelectric instrument which normally operates from light transmitted through a specimen to operate from light reflected therefrom, such instrument having a hinged arm resting on a platform, said arm forming a housing enclosing a phototube and having an aperture at the side facing said platform for the access of light, comprising a block of substantially rectangular cross section having a sloping top wall accommodating the angle of said arm when lifted from said platform and placed thereon, side flanges extending from said top wall between which said arm may be clamped, a light passageway inside said block between said top wall and the bottom thereof, said bottom being hollowed out defining thereby a light-sealed enclosure, a plurality of lights in said enclosure for illuminating a specimen over which said block is placed, a cut-out communicating with said enclosure permitting observation of the placement of said block over the specimen, said enclosure thereby forming a shield around the specimen excluding substantially all extraneous light.

2. Attachment according to claim 1 wherein said light passageway comprises a tubular extension normal to said top wall and fitting into the light access aperture in said arm forming a seal excluding extraneous light, a tubular portion in the body of said block extending downwardly and in the direction normal to the plane of said top wall, a cylindrical portion attached thereto extending in the direction normal to the plane of said platform, a lens for collecting the light entering said cylindrical portion and forming an image of the area of the specimen being illuminated and a prism adjacent said lens for deflecting said collected light in the direction coaxial with said tubular portion.

3. Attachment in accordance with claim 1 wherein opposite side walls of said block have a slit slidably accommodating a strip carrying a plurality of color filters for selective placement in said light passageway.

4. Attachment in accordance with claim 1 wherein a pressure brace extends diagonally across the bottom of said block for flattening the specimen, said brace having an opening coaxial with said light passageway.

References Cited in the file of this patent

UNITED STATES PATENTS

| | | |
|---|---|---|
| 1,828,000 | Ranger | Oct. 20, 1931 |
| 2,078,800 | Juchter | Apr. 27, 1937 |
| 2,329,897 | Heinicke | Sept. 21, 1943 |
| 2,484,323 | Sweet | Oct. 11, 1949 |
| 2,631,243 | Weber et al. | Mar. 10, 1953 |